Sept. 4, 1951  R. G. LARSON  2,566,616
LOGGING APPARATUS
Filed Jan. 26, 1950  2 Sheets-Sheet 2

Inventor
Reuben G. Larson

By Clarence A. O'Brien
and Harvey B. Jacobson
Attorneys

Patented Sept. 4, 1951

2,566,616

UNITED STATES PATENT OFFICE 2,566,616

LOGGING APPARATUS

Reuben G. Larson, La Crosse, Wis.

Application January 26, 1950, Serial No. 140,700

5 Claims. (Cl. 214—65.3)

This invention relates to new and useful improvements in logging devices and more particularly to an attachment to be placed on a tractor for towing, pulling, raising or dragging logs.

An important feature of this invention is to provide a device of this character which is simple in construction and which may be readily mounted on a tractor without disturbing the present parts or function of said tractor.

Another feature of this invention is to provide a device of this character attached to a tractor whereby, with the lifting of the log away from the ground, the tractor wheels have greater traction with the ground and without unbalancing the tractor.

A further feature of this invention is to provide a device of the character referred to that is strong and durable in construction, efficient and reliable in operation, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like reference numerals refer to like parts throughout, and in which:

Figure 1:
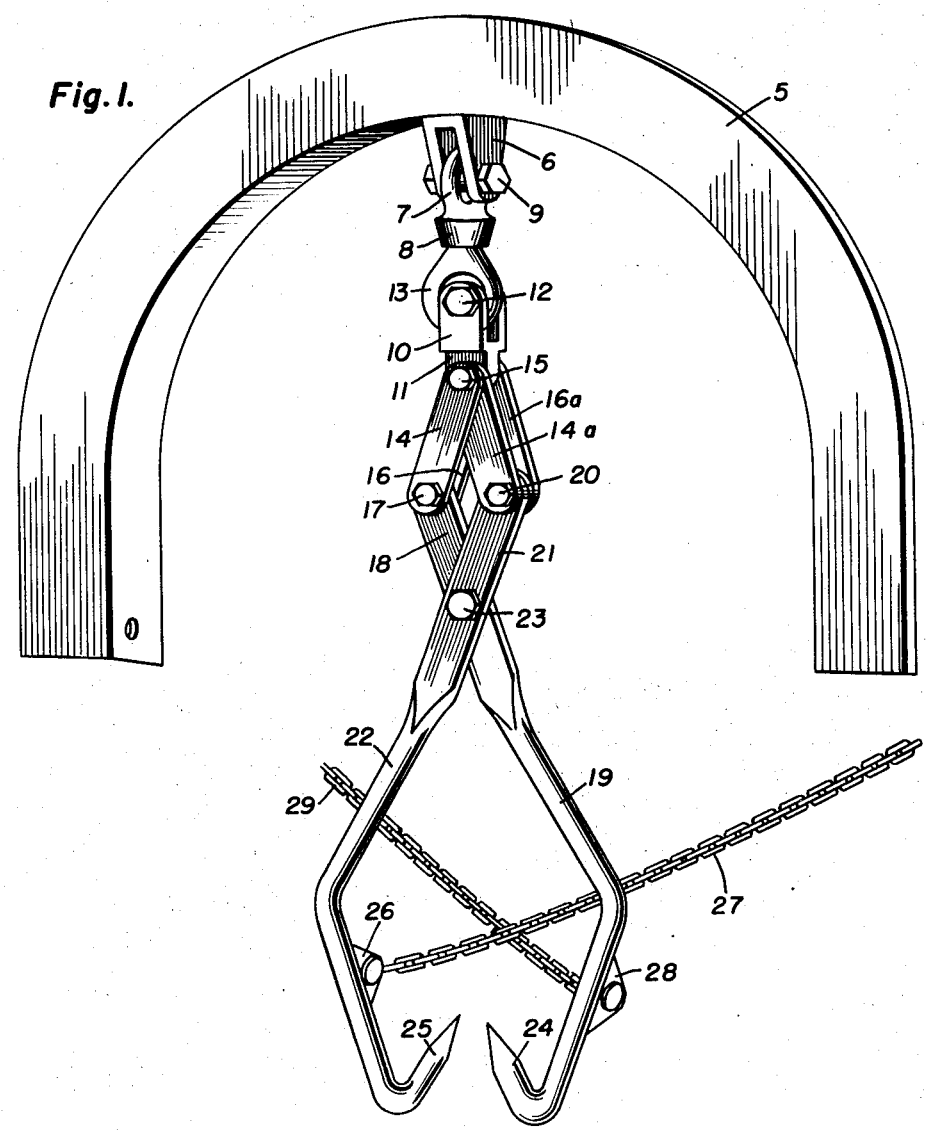
Figure 1 is a perspective view of the device removed from a tractor frame.
Figure 2:
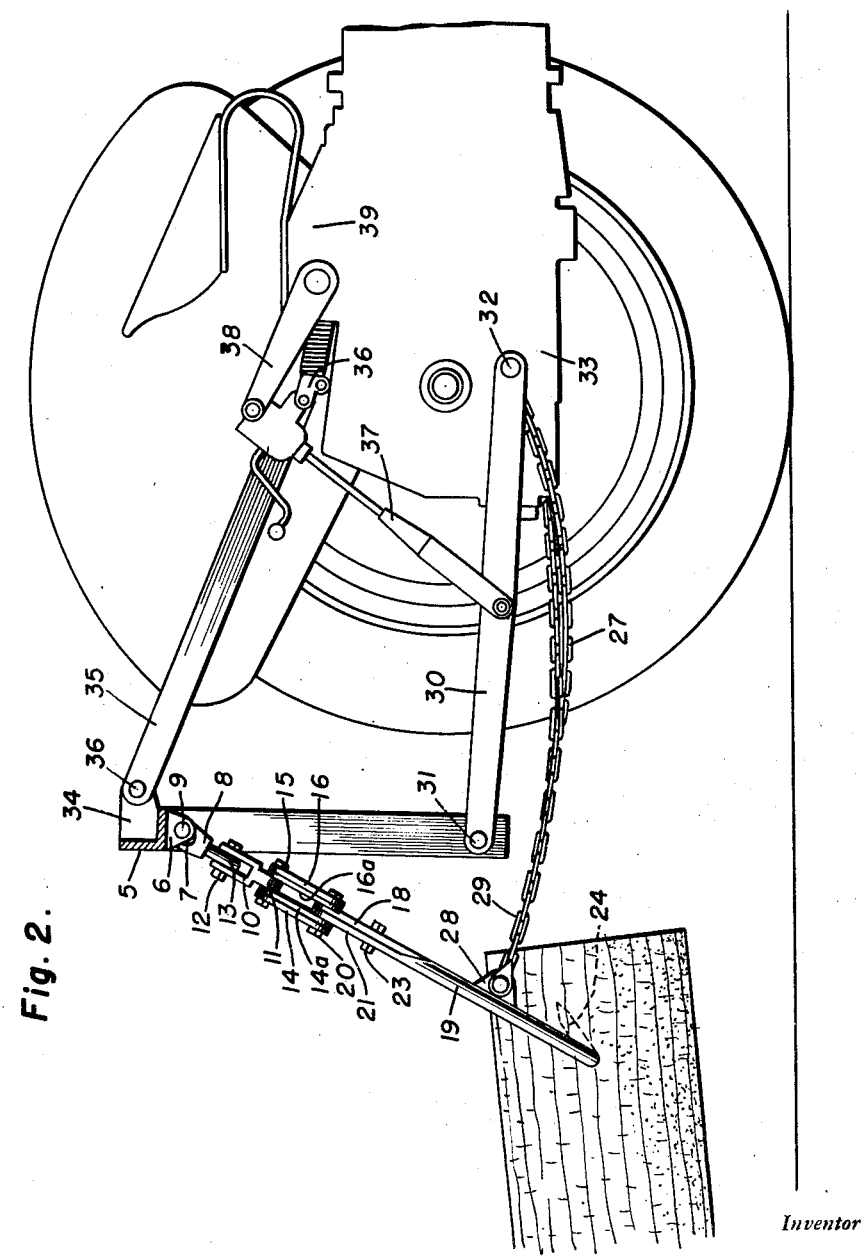
Figure 2 is a side elevational view of the device in use attached to the frame of a tractor (shown in part).

Referring now to the drawings in detail, wherein, for the purpose of illustration, I have disclosed a preferred embodiment of the invention, the numeral 5 represents an angle iron bent substantially to form an inverted semi-circular main frame member.

Pivotally connected by conventional means to the lower flange of member 5 and centrally located on said flange is a substantially inverted U-shaped swivel yoke 6.

The upper smaller eye end 7 of a swivel 8 is connected to said swivel yoke 6 by a bolt and nut 9.

A substantially U-shaped link 10 having a downwardly extending tongue 11 is pivotally connected by a nut and bolt 12 to the lower, larger eye end 13 of the swivel 8.

The upper overlapping ends of a pair of link plates 14 and 14a are pivotally connected to one side of tongue 11 by a nut and bolt 15 and the upper overlapping ends of a second pair of link plates 16 and 16a are pivotally connected on said bolt and nut 15 to the opposite side of tongue 11.

The lower end of link plate 14 and the lower end of link plate 16 are pivotally connected by a nut and bolt 17 on opposite sides of the upper flat end 18 of a lifting tong 19.

The lower end of link plate 14a and the lower end of link plate 16a are pivotally connected by a nut and bolt 20 on opposite sides of the upper flat end 21 of a second lifting tong 22.

The upper end 18 of tong 19 and the upper end 21 of tong 22 cross each other and are pivotally connected by a bolt and nut 23.

The lower sharpened end 24 of tong 19 and the lower sharpened end 25 of tong 22 are preferably bent at an upwardly inclined converging angle, thereby assuring a positive grip for said tongs 19 and 22.

Suitably secured to the lower end of tong 19 and extending outwardly therefrom is an eye 26 adapted to pivotally receive one end of a flexible, preferably link chain 27, and suitably secured to the lower end of tong 22 and extending outwardly therefrom is a second eye 28 adapted to pivotally receive one end of a second flexible link chain 29, said chain 27 crossing over chain 29, as shown in Figure 1.

A pair of lower lift arms 30 are pivotally connected at 31 to the lower ends of frame 5, the opposite ends of said arms being pivotally connected at 32 to the rear of the tractor 33.

A connecting plate 34 is suitably secured to the upper end of frame 5 and the outer end of an upper arm 35 is pivotally connected at 36 to said plate 34.

The inner end of arm 35 is suitably secured to a conventional draft coupling 36 suitably mounted on the tractor.

An adjustable link 37 connects the upper pair of lift arms 38 to the lower pair of lift arms 30 of the usual hydraulic lift mechanism 39 of the tractor.

The conventional hydraulic lift mechanism is adapted to raise and lower the frame 5 vertically and as said frame is raised, the sharpened ends of the lifting tongs bite into a log 40 due to the inwardly pulling action of the chains 27 and 29 on said tongs, said inner ends of said chains 27 and 29 being suitably secured to the tractor frame.

In view of the foregoing description taken in conjunction with the accompanying drawings, it is believed that a clear understanding of the construction, operation and advantages of the device will be quite apparent to those skilled in this art.

A more detailed description is accordingly deemed unnecessary.

It is to be understood, however, that even though I have herein shown and described a preferred embodiment of my invention that the same is susceptible to certain changes fully comprehended by the spirit of the invention as herein described and within the scope of the appended claims.

Having described the invention, what is claimed as new is:

1. A logging attachment for a tractor having a lift mechanism, said attachment comprising a substantially semi-circular frame, a substantially inverted U-shaped swivel yoke carried by said frame, a swivel pivotally connected to said yoke, a pair of tongs having lower terminal hooks, the upper ends of said tongs crossing each other and pivotally connected together, connecting means between the swivel and tongs, flexible chains anchoring the said tongs to the tractor, said chains holding the tongs to the tractor as the frame is raised vertically to force the prongs inwardly toward each other, and means connecting the frame to the lift mechanism carried by the tractor for raising and lowering said frame in a substantially vertical plane.

2. A logging attachment for a tractor having a lift mechanism, said attachment comprising a substantially semi-circular frame, a substantially inverted U-shaped swivel yoke carried by and depending from the web portion of the frame, a swivel pivotally connected to said yoke, a substantially U-shaped link pivotally connected to the lower end of the swivel, a tongue extending downwardly from said link, said tongue being an integral part of said link, a pair of lifting tongs having lower terminal hooks, the upper ends of said tongs crossing each other and pivotally connected together, connecting means between the upper ends of the tongs and the tongue extending downwardly from the link, a pair of crossed, flexible chains anchoring the lower ends of the tongs to the tractor frame to direct the terminal hooks of said tongs inwardly toward each other as the frame is raised vertically, and means connecting the frame to the lift mechanism carried by the tractor for raising and lowering the frame in a substantially vertical plane.

3. A logging attachment for a tractor having a lift mechanism, said attachment comprising a substantially U-shaped frame, a substantially inverted U-shaped swivel yoke carried by the web portion of said frame, a swivel pivotally connected to said yoke, a substantially U-shaped link pivotally connected to the lower end of the swivel, a tongue extending downwardly from said link, said tongue being an integral part of said link, a pair of lifting tongs having lower terminal hooks, the upper ends of said tongs crossing each other and pivotally connected together, the upper ends of a pair of connecting links pivotally connected to one side of the tongue, a second pair of connecting links pivotally connected to the opposite side of said link, the lower end of one of the first-named links and the lower end of one of the second-named links pivotally connected to the upper end of one of the tongs, the lower end of the other of the first-named links and the lower end of the other of the second-named links pivotally connected to the upper end of the other tong, flexible chains anchoring the tongs to the tractor frame for directing the terminal hooks of said tongs inwardly toward each other as the frame is raised vertically, and means connecting the frame to the lift mechanism carried by the tractor for raising and lowering the frame in a substantially vertical position.

4. A logging attachment for a tractor having a lift mechanism, said attachment comprising a substantially semi-circular frame, a substantially inverted U-shaped swivel yoke carried by the frame, a swivel pivotally connected to said yoke, a substantially U-shaped link pivotally connected to the lower end of the swivel, a tongue extending downwardly from said link, said tongue being an integral part of said link, a pair of lifting tongs, the upper ends of said tongs crossing each other and pivotally connected together, the upper ends of a pair of connecting links pivotally connected to one side of the tongue, a second pair of connecting links pivotally connected to the opposite side of said link, the lower end of one of the first-named links and the lower end of one of the second-named links pivotally connected to the upper end of one of the tongs, the lower end of the other of the first-named links and the lower end of the other of the second-named links pivotally connected to the upper end of the other tong, a pair of flexible chains crossing each other and anchoring the lower ends of the tongs to the tractor frame, said chains directing the lower ends of the tongs inwardly toward each other as the frame is raised vertically, the lower sharpened ends of the tongs bent at an upwardly inclined converging angle and having pointed extremities, thereby assuring positive gripping of said tongs into a log, and means connecting the frame to the lift mechanism carried by the tractor for raising and lowering the frame in a substantially vertical plane.

5. A logging attachment for a tractor having a lift mechanism, said attachment comprising a substantially semi-circular frame, a pair of tongs having sharpened lower ends pivotally carried by the frame, said tongs hanging downwardly from the central portion of said frame, anchoring means between the tongs and the tractor frame whereby a raising of the semi-circular frame is adapted to cause the sharpened ends of the tongs to bite into a log, means connecting the upper portion of the frame to a part of the tractor, and means connecting the lower portion of the frame to the tractor lift mechanism, said upper and lower connecting means cooperating to maintain the frame in a substantially vertical plane during raising thereof by the lift mechanism.

REUBEN G. LARSON.

REFERENCES CITED

The following references are of record in the file of this patent:

UNITED STATES PATENTS

| Number | Name | Date |
|---|---|---|
| 801,415 | Strange | Oct. 10, 1905 |
| 810,980 | Riddle | Jan. 30, 1906 |
| 2,050,548 | Uhren et al. | Aug. 11, 1936 |
| 2,407,993 | McKee | Sept. 24, 1946 |
| 2,505,923 | Taylor et al. | May 2, 1950 |
| 2,520,722 | Irrer | Aug. 29, 1950 |